United States Patent
Ito

(10) Patent No.: US 7,050,203 B2
(45) Date of Patent: May 23, 2006

(54) COMPOSITE APPARATUS AND METHOD FOR CONTROLLING ENTERING OF THE SLEEP STATE

(75) Inventor: Yuki Ito, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 964 days.

(21) Appl. No.: 09/876,082

(22) Filed: Jun. 8, 2001

(65) Prior Publication Data

US 2002/0186397 A1    Dec. 12, 2002

(51) Int. Cl.
*H04N 1/40* (2006.01)
*H04N 1/32* (2006.01)

(52) U.S. Cl. .................. 358/468; 358/448

(58) Field of Classification Search .......... 358/1.15, 358/401, 448, 443, 468, 504, 501, 405, 406, 358/410, 413; 363/67; 347/3
See application file for complete search history.

(56) References Cited

U.S. PATENT DOCUMENTS

| 6,396,324 B1* | 5/2002 | Hsu et al. .............. 327/298 |
| 2002/0126516 A1* | 9/2002 | Jeon ..................... 363/67 |
| 2005/0034002 A1* | 2/2005 | Flautner ................. 713/322 |

FOREIGN PATENT DOCUMENTS

| EP | 0419908 A2 * | 4/1991 |
| JP | 11-146103 | 5/1999 |

* cited by examiner

*Primary Examiner*—Jerome Grant, II
(74) *Attorney, Agent, or Firm*—Foley & Lardner LLP

(57) ABSTRACT

The present invention relates to a composite apparatus and a method of controlling the composite apparatus. When a system controller places one processing section of a scanner section, a printer engine, a facsimile device, and a printer controller in a sleep state, the system controller checks whether or not another processing is ready. When it is checked that such another processing section is ready, all times of the other processing sections are synchronized with a timer of such one processing section. Then, the power circuit is controlled to be driven, and is controlled so as to be placed in a sleep state.

8 Claims, 4 Drawing Sheets

COMPOSITE APPARATUS AND METHOD FOR CONTROLLING ENTERING OF THE SLEEP STATE

BACKGROUND OF THE INVENTION

In recent years, a facsimile apparatus and a printer controller or the like are connected to a digital copying machine that is an image forming apparatus, and one composite apparatus functioning as a copying machine, a facsimile machine, and a printer or the like is developed and generally used.

At such a composite apparatus, in general, a sleep function for automatically reducing power consumption is provided when the composite apparatus is inactive for a predetermined time.

Techniques for controlling the sleep function in such a composite apparatus are mainly divided into two sections below. That is, one is a first control technique for setting and controlling a timer for managing the sleep function to the entire composite apparatus in batch, and the other one is a second control technique for controlling a timer for managing the sleep function independently by each processing means of the composite apparatus.

In this first control technique, processing means with its use frequency as well is initiated every time processing means with its use frequency is used. Therefore, wasteful power consumption occurs. In addition, although the initiation times of processing means are different from each other, the sleep function must be controlled in batch. Therefore, a time may be set to be long according to processing means with its slow initiation or may be set to be short according to processing means with its fast initiation. In this case, if the timer is adjusted to means with its slow initiation, wasteful consumption occurs. In contrast, if the timer is adjusted to processing means with its fast initiation, operability is impaired, and startup power consumption increases.

On the other hand, in the second control method, the sleep function of each processing means is controlled completely independently. Therefore, only required processing means can be initiated and used. In addition, each timer for controlling the sleep function can be freely used according to the initiation time of each processing means.

However, in actuality, in main operation of a digital copying machine, some of the processing means of the digital copying machine main body are often used at the same time. In addition, in the case of the composite apparatus, only a printer controller or facsimile apparatus is used when changes such as settings are made through an external interface or when each item of information is computed. In general, when printer output or facsimile reception/transmission is carried out, part of processing means of the printer controller or facsimile apparatus and digital copying machine main body are used at the same time. Namely, when the operationally associated processing means is placed in a sleep state, there is a low possibility that operation is carried out.

Therefore, in view of such a circumstance, if each processing means is controlled completely independently, for example, after printer controller information is communicated through an external interface, even if all processing means of the digital copying machine main body are placed in a sleep state, there can occur a state in which only the printer controller enters a standby state without entering the sleep state. Such a state generates wasteful power consumption from the viewpoint of operation of the composite apparatus.

As an associated technique, in Jpn. Pat. Appln. KOKAI Publication No. 11-146103, in order to prevent wasteful power consumption in a copying machine, there is disclosed a technique concerning a composite apparatus for setting a predetermined time interval or a predetermined time to each of the processing means of the composite apparatus to cause each of the processing means of the composite apparatus to work the auto sleep function or the like independently.

However, in this technique, there is neither suggestion nor disclosure that operationally associated processing means are placed in synchronism with the sleep state.

BRIEF SUMMARY OF THE INVENTION

The present invention has been made in view of the foregoing problem. It is an object of the present invention to place a plurality of processing means each in the sleep state in synchronism with operationally associated processing means irrespective of a state of the timer arranged for each processing means, thereby enabling the timer to be placed in and controlled to a preferable sleep state based on such operation, and reducing wasteful power consumption.

In order to achieve the foregoing object, according to the present invention, there is provided a composite apparatus, comprising: a plurality of processing sections each having an independent timer for judging whether or not the timer is placed in a sleep state; and a control section for, when one processing section is placed in a sleep state, checking whether or not another processing section is ready, and, when it is checked that such a processing section is ready, controlling all the ready timers of the processing sections to be placed in a sleep state in synchronism with a timer of one processing section.

Further, according to one aspect of the present invention, there is provided a composite apparatus comprising: a power circuit for supplying power to each section; a scanner section for reading a manuscript, thereby acquiring manuscript image data; a printer engine for carrying out print processing; a facsimile device; a printer controller having its own control section; and a system controller for, when one processing section of one of the scanner section printer engine, facsimile device, and printer controller is placed in a sleep state, checking whether or not another processing section is ready, and, when it is checked that another processing section is ready, synchronizing all timers of the other processing sections that are ready with a timer of such one processing section, thereby controlling the power circuit to be driven, and controlling the timers to be placed in a sleep state.

According to another aspect of the present invention, there is provided a method of controlling a composite apparatus having a plurality of processing means, comprising the steps of: when one of a plurality of processing means is placed in a sleep state, checking whether or not another processing means is ready; when it is checked that such another processing means is ready, synchronizing all the timers of the processing means that are ready with a timer of such one processing means; and placing such one processing means and processing means that is ready in a sleep state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, preferred embodiments of the present invention will be described with reference to the accompanying drawings.

Figure 1:
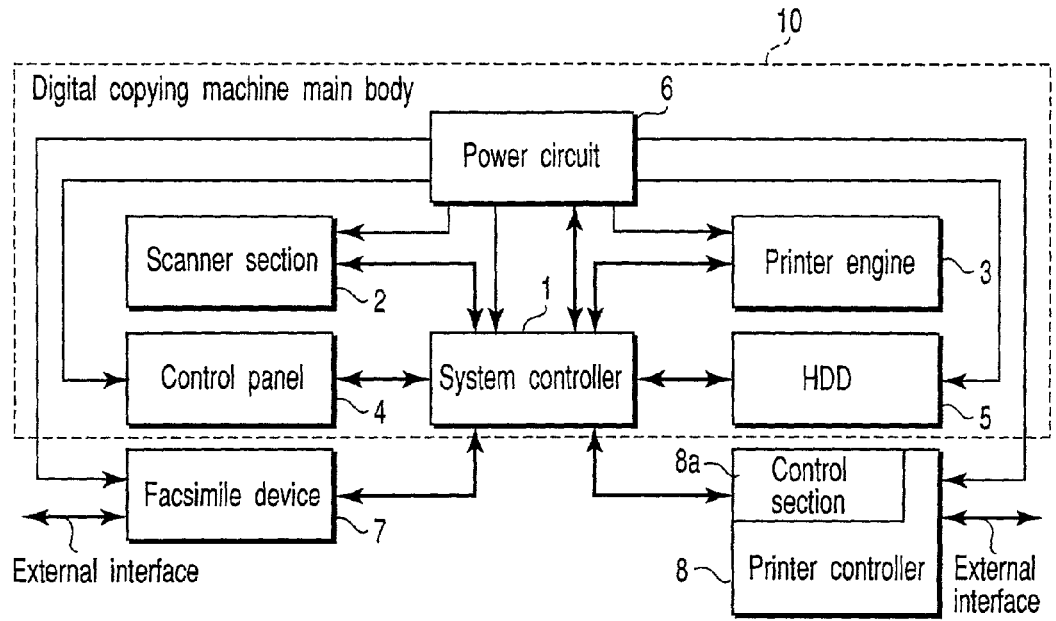
FIG. 1 is a view showing a construction of a composite apparatus according to one embodiment of the present invention.

FIG. 1 shows and describes a construction of a composite apparatus according to one embodiment of the present invention. As shown in FIG. 1, at a digital copying machine main body 10 that is a part of the composite apparatus, there are provided a system controller 1, a scanner section 2, a printer engine 3, a control panel 4, a HDD 5, and a power circuit 6, wherein these elements are communicable with each other. Further, the system controller 1 communicably connected to a facsimile device 7 outside of the copying machine main body 10 and a printer controller 8 as well.

The claimed processing means and processing section, the processing means and processing section used therein conceptually include the scanner section 2, printer engine 3, facsimile device 7, and a printer controller 8 and the like. In addition, the claimed control means conceptually includes a system controller 1. These processing means and processing section are not limited thereto.

In such a construction, the scanner section 2 reads a manuscript image that consists of a main scanning direction and a subsidiary scanning direction, and converts the image information into an electrical signal (image data). The printer engine 3 forms an image on an image forming medium based on image data obtained by means of the scanner section 2.

The control panel 4 comprises an operating section and a display section. Specifically, the operating section is composed of an operating key or a touch panel. The operating section is intended to input settings and operational instructions of the digital copying machine, facsimile device, and printer or the like. The display section is composed of an LCD or the like. The display section is intended to displaying settings and operating processes of the digital copying machine, facsimile device, and printer or the like. These display section and operating section can be integrated with each other.

The HDD 5 is intended to store image data or information associated with the image data, and program data or the like.

The facsimile device 7 connected to the system controller 1 inside of the digital copying machine main body 10 has an external interface with a telephone line. This facsimile device 7 transmits image data read by the scanner section 2 inside of the digital copying machine main body 10 to another facsimile device, and outputs image data received from such another facsimile device to the printer engine 3.

The printer controller 8 has a network interface or the like. This printer controller 8 outputs image data or the like received from a computer or the like connected via a network interface to the printer engine 3 inside of the digital copying machine main body 10 under the control of a control section 8a.

Here, at the digital copying machine main body 10, each section is controlled around the system controller 1. Each section outside of the digital copying machine main body 10 such as facsimile device 7 or printer controller 8 is controlled by a control section owned by such each section or the system controller 1 in the digital copying machine main body 10.

However, when a unique control section is provided, information or command and the like is communicated between the control section and the system controller in the digital copying machine main body 10.

In addition, power is supplied to each section by the power circuit 6, and these controls are effected by the system controller 1.

At each of these sections, there is provided "a sleep function" for, when such each section is not used, automatically reducing power consumption more significantly than a normal operation state. In "the sleep function" used here, a control section controlling each section controls a power supply state independently of such each section based on a timer that exists independently at such each section.

Figure 2:
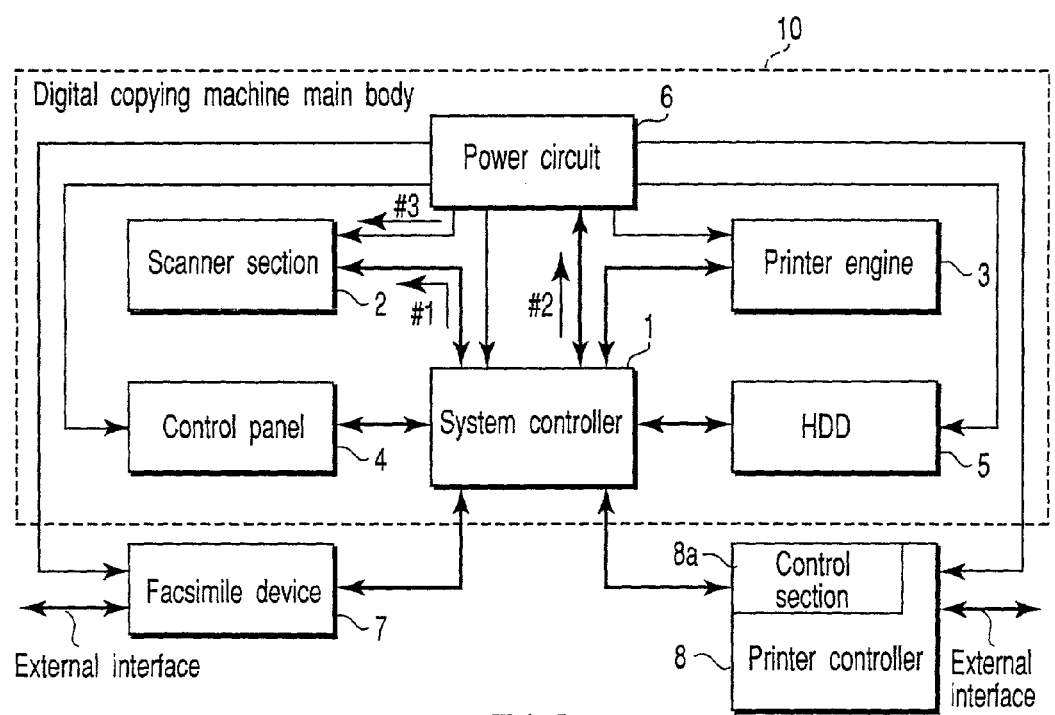
FIG. 2 is a view illustrating a case in which a scanner section 2 in a digital copying machine main body 10 is placed in a sleep state in the composite apparatus according to one embodiment of the present invention.
Figure 3:
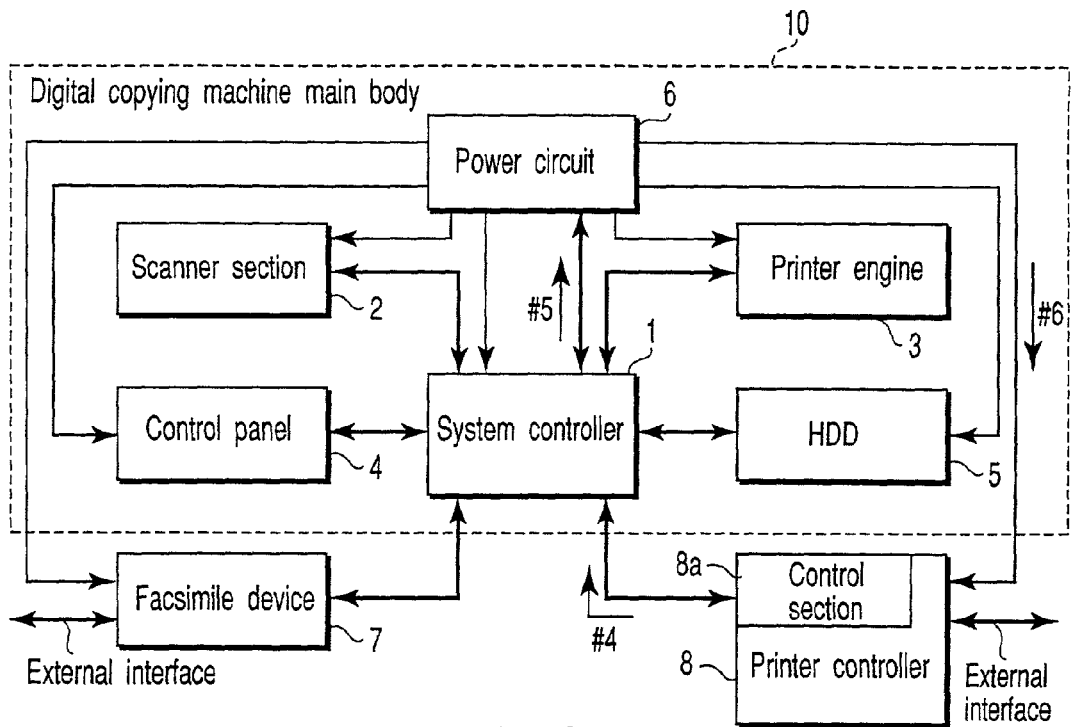
FIG. 3 is a view illustrating a case in which a printer controller outside of a digital copying machine main body 10 is placed in a sleep state in the composite apparatus according to one embodiment of the present invention.

Hereinafter, an example of such operation will be described with reference to FIGS. 2 and 3.

First, a case in which the scanner section 2 in the digital copying machine main body 10 is placed in a sleep state will be described with reference to FIG. 2.

In this case, if the system controller 1 senses that the scanner section 2 has been inactive for a timer predetermined time, the controller first notifies to the scanner section 2 that the scanner section 2 is placed in a sleep state (#1). In accordance with this notification, the scanner section 2 carries out predetermined processing so that no problem occurs even if power supply is reduced as required.

After such processing, the system controller 1 controls the power circuit 6 (#2), and reduces power supply to the scanner section 2 (#3). By doing this, the scanner section 2 is placed in a sleep state.

Now, a case in which the printer controller 8 outside of the digital copying machine main body 10 is placed in a sleep state will be described with reference to FIG. 3.

This case is different from a case in which the scanner section 2 is placed in a sleep state.

That is, because the printer controller 8 has its own unique control section 8a, when the controller is placed in a sleep state, the controller communicates a command between the control section 8a and the system controller 1, and carries out predetermined control. Namely, when the printer controller 8 is not used for a predetermined time, the control section 8*a* of the printer controller 8 controls processing to be carried out so that no problem occurs even if power supply to the printer controller 8 is reduced as required. Then, a command for placing the printer controller 8 in a sleep state is communicated with the system control 1 (#4). The system controller 1 having received such a command controls the power circuit 6 (#5), and reduces power supply to the printer controller 8 (#6).

By doing this, the printer controller 8 is placed in a sleep state. The sleep function as described above is provided similarly for each section of the composite apparatus.

Here, the composite apparatus according to the embodiments of the present invention is characterized in that there are provided a function for synchronizing one section with the other section, thereby placing it in a sleep state together with a sleep function for causing such each section to be controlled independently.

Hereinafter, such a function will be described in detail with reference to FIGS. 4 and 5.

First, an example when the scanner section 2 is placed in a sleep state during printer output will be described with reference to FIG. 4. This example assume a state after facsimile reception has been carried out by the facsimile device 7.

When the system controller 1 senses that the scanner section 2 has been inactive for a timer predetermined time, the controller notifies to the scanner section 2 that the controller should be placed in a sleep state (#11). In accordance with the notification, the scanner section 2 carries out predetermined processing so that no problem occurs even if power supply is reduced as required.

Further, the system controller 1 is assumed as having means for recognizing the operating state of each section. Accordingly, at this time, it is checked whether or not there exists a processing that is ready, and that is neither currently active nor is in a sleep state. When there exists such a processing section, it is notified to the processing section that this section should be placed in a sleep state.

However, at this time, a unique timer of the processing section that is ready may not be elapsed by a predetermined time. Namely, the timer of the processing section is assumed to be synchronized with that of the scanner section 2 at a time when the timer is notified to be placed in a sleep state. This can be one of the features of the present embodiment.

Figure 4:
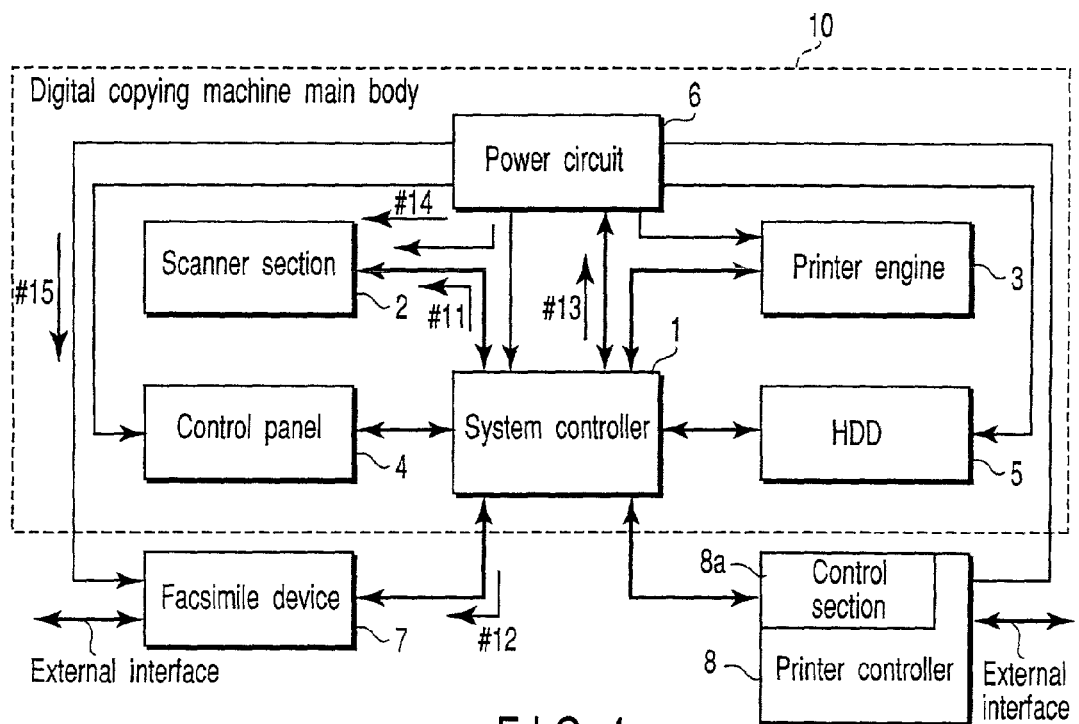
FIG. 4 is a view illustrating a case in which the scanner section 2 is placed in a sleep state during printer output in the composite apparatus according to one embodiment of the present invention.

In an example shown in FIG. 4, the facsimile device 7 is ready, and thus, it is notified to the facsimile device 7 that the device should be placed in a sleep state (#12). In accordance with the notification, a timer of the facsimile device 7 synchronizes with that of the scanner section 2.

The facsimile device 7 carries out predetermined processing so that no problem occurs even if power supply is reduced as required. Then, the system controller 1 controls the power circuit 6 (#13), and reduces power supply to the scanner section 2 and facsimile device 7 (#14 and #15). In accordance with a series of the above processing, the scanner section 2 and facsimile device 7 are placed in a sleep state.

Now, an example when the printer engine 3 is placed in a sleep state during facsimile transmission will be described with reference to FIG. 5. This example assumes a state after information on the printer controller 8 has been communicated with a computer having an external interface of the printer controller 8 connected thereto.

In this case, unlike a case of FIG. 4, a processing section being ready is a printer controller 8 having its own unique control section 8*a*. Thus, a control for placing the printer controller 8 in a sleep state is made via communication between the system controller 1 and the control section 8*a* of the printer controller 8. A detailed description will be given below.

First, when the system controller 1 senses that the printer engine 3 has been inactive for a timer predetermined time, the controller notifies to the printer engine 3 that the engine should be placed in a sleep state (#21).

In accordance with the notification, the printer engine 3 carries out predetermined processing so that no problem occurs even if power supply is reduced as required. Further, the system controller 1 checks whether or not a processing section other than the printer engine 3 is ready.

Figure 5:
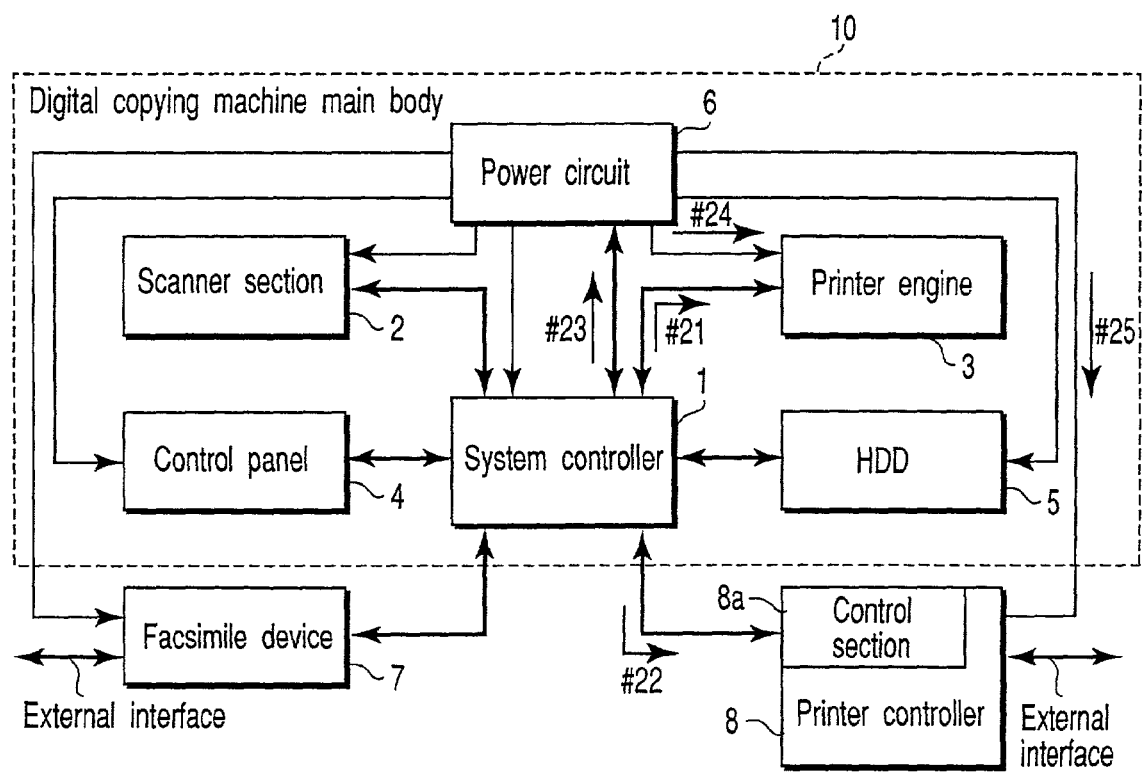
FIG. 5 is a view illustrating a case in which a printer engine 3 is placed in a sleep state during facsimile transmission in the composite apparatus according to one embodiment of the present invention.

In an example shown in FIG. 5, it is found that the printer controller 8 is ready according to information from the control section 8*a* of the printer controller 8.

Therefore, the system controller 1 communicates with the control section 8*a* of the printer controller 8 that the control section should be placed in a sleep state (#22). In accordance with this communication, a timer of the printer controller 8 synchronizes with that of the printer engine 3.

In addition, the control section 8*a* of the printer controller 8 controls the printer controller 8 to carry out processing so that no problem occurs even if power supply is reduced as required. Then, the system controller 1 controls the power circuit 6 (#23), and reduces power supply to the printer engine 3 and printer controller 8 (#24 and #25). In accordance with a series of the above processing, the scanner section 2 and printer controller 8 are placed in a sleep state.

Figure 6:
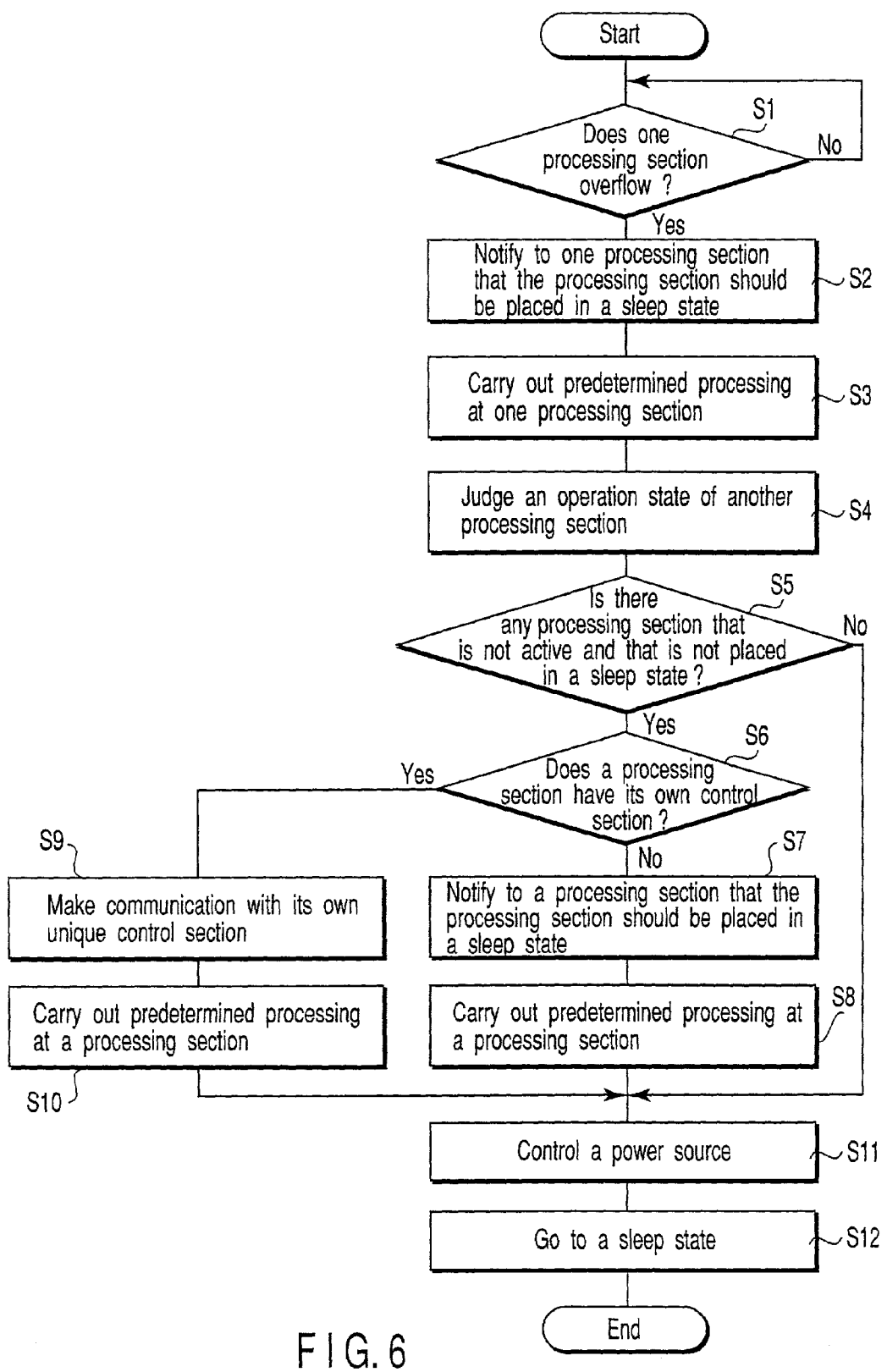
FIG. 6 is a view illustrating a method of controlling a composite apparatus according to one embodiment of the present invention.

Lastly, a method of controlling a composite apparatus according to one embodiment of the present invention will be described with reference to a flow chart shown in FIG. 6.

First, if a timer of one processing section overflows (step S1), the system controller 1 notifies to the processing section that the processing section should be placed in a sleep state (step S2). Then, the processing section carries out predetermined processing so that the processing section may be placed in a sleep state (step S3).

Then, the system controller 1 judges an operating state of another processing section (step S4). Then, the controller judges whether or not there exists the processing section that is not active and is not placed in a sleep state (step S5).

When such a processing section exists, the controller judges whether or not the processing section has its own unique control section (step S6). If not the controller notifies to the processing section detected at the step S5 that the processing section should be placed in a sleep state (step S7). The processing section carries out predetermined processing so that the processing section may be placed in a sleep state (step S8).

On the other hand, when the processing section detected at the step S5 has its own unique control section, predetermined communication is made between the system controller 1 and its own unique control section, and the processing section carries out predetermined processing in accordance with the result (steps S9 and S10).

When it is judged that such any processing section does not exist at the step S5, processing goes to the step S11.

In this way, the system controller 1 controls the power circuit 6, and carries out power control (step S11). Then, the above processing section is placed in a sleep state (step S12). Then, this sequence is terminated.

As has been described above, according to the composite apparatus of the present invention, there is provided a function for synchronizing one processing section with another processing section, and then, placing these sections in a sleep state, whereby power supply can be controlled based on only a timer and operation. Thus, wasteful power consumption can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A composite apparatus, comprising:
   plurality of operationally associated processing means each having an independent timer for judging whether or not the timer is placed in a sleep state; and
   control means for, when one processing means is placed in a sleep state, checking whether or not another processing means is ready, and when it is checked that such another processing means is ready, regardless of a state of timers disposed in all processing means that are ready, controlling the timers of all the processing means that are ready to be placed in a sleep state in synchronism with a timer of the one operationally associated processing means placed in a sleep state.

2. A composite apparatus according to claim 1, wherein said control means further comprises an operating state sensing means for sensing an operating state of each processing means, and it is checked by the operating state sensing means as to whether or not processing means is ready.

3. A composite apparatus according to claim 1, wherein, when each of said processing means has its own internal control means, the internal control means control each processing means respectively, to be placed in a sleep state.

4. A composite apparatus according to claim 1, wherein, when each of said processing means has its own internal control means, communication is made between the internal control means and said control means, and it is judged whether or not the processing section can be placed in a sleep state based on the result.

5. A composite apparatus, comprising:
   a power circuit configured to supply power to each section;
   a scanner section configured to read a manuscript, thereby acquiring manuscript image data;
   a printer engine configured to carry out print processing;
   a facsimile device;
   a printer controller having its own control section, wherein a respective processing section of each of the scanner section, the print engine, the facsimile device, and the printer controller includes an independent timer; and
   a system controller for, when one operationally associated processing section of one of the scanner section, printer engine, facsimile device, and printer controller is placed in a sleep state, checking whether or not another processing section is ready, and, in the case that it is checked that another processing section is ready, regardless of the state of the timers disposed in each of the processing sections that are ready, synchronizing all timers of the processing sections that are ready with a timer of the one operationally associated processing section placed in a sleep state, thereby controlling the power circuit to be driven and controlling the processing sections to be placed in a sleep state.

6. A composite apparatus according to claim 5, wherein, when said printer controller is placed in a sleep state, a system controller makes predetermined communication with a control section inside of the printer controller, and then, places the printer controller in a sleep state based on the result.

7. A method of controlling a composite apparatus having a plurality of processing means each having a timer, comprising the steps of:
   when one of a plurality of operationally associated processing means is placed in a sleep state, checking whether or not another processing means is ready;
   when it is checked that such another processing means is ready, synchronizing all the timers of all processing means that are ready with a timer of the one operationally associated processing means placed in a sleep state, regardless of the state of the timers of the processing means that are ready; and
   placing the one processing means and the processing means that are ready in a sleep state.

8. A method of controlling a composite apparatus according to claim 7, further comprising the step of, in the case where each of said processing means has its own unique internal control means, making communication between the internal control means and a system control means, and then, judging by the system control means whether or not the processing means can be placed in a sleep state based on the result.

* * * * *